United States Patent
Schwartz

(10) Patent No.: US 9,805,013 B2
(45) Date of Patent: Oct. 31, 2017

(54) GROUPING FORMS BY TASK IN A MANIFEST

(71) Applicant: Edward L. Schwartz, Menlo Park, CA (US)

(72) Inventor: Edward L. Schwartz, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 497 days.

(21) Appl. No.: 13/789,426

(22) Filed: Mar. 7, 2013

(65) Prior Publication Data

US 2014/0258818 A1 Sep. 11, 2014

(51) Int. Cl.
- *G06F 17/00* (2006.01)
- *G06F 17/24* (2006.01)
- *G06F 17/30* (2006.01)

(52) U.S. Cl.
CPC ............ *G06F 17/243* (2013.01); *G06F 17/30* (2013.01)

(58) Field of Classification Search
CPC .......................... G06Q 10/06311; G06F 17/30
See application file for complete search history.

(56) References Cited

U.S. PATENT DOCUMENTS

| | | | |
|---|---|---|---|
| 6,587,895 B1* | 7/2003 | Golovchinsky | G06Q 10/109 710/12 |
| 2003/0171970 A1* | 9/2003 | Kinsella | 705/9 |
| 2004/0074173 A1* | 4/2004 | Miller | 52/234 |
| 2007/0220042 A1* | 9/2007 | Mueller et al. | 707/102 |
| 2012/0035925 A1* | 2/2012 | Friend | G06F 3/167 704/235 |
| 2013/0061124 A1* | 3/2013 | Patton et al. | 715/224 |
| 2013/0282418 A1* | 10/2013 | Furman et al. | 705/7.13 |

* cited by examiner

*Primary Examiner* — Andrew McIntosh
(74) *Attorney, Agent, or Firm* — Patent Law Works LLP

(57) ABSTRACT

A system and method for creating one or more manifests that group one or more forms by one or more tasks is described. A manifest application determines one or more tasks and a first order for the one or more tasks, determines one or more forms associated with each task and a second order for the one or more forms within each task, generates one or more user interface elements that each link to a corresponding form within each tasks, generates a manifest comprising a summary of the one or more tasks in the first order, the forms in the second order for each task and the user interface elements that each link to a corresponding form and provides the manifest for display on a portable computing device.

20 Claims, 8 Drawing Sheets

GROUPING FORMS BY TASK IN A MANIFEST

BACKGROUND OF THE INVENTION

1. Field of the Invention

The specification relates to a system and method for grouping one or more forms in a manifest. In particular, the specification relates to grouping the one or more forms by one or more tasks included in the manifest.

2. Description of the Background Art

Portable computing devices can be used to input information into one or more forms. The one or more forms are received from multiple sources and ordered on a display of the portable computing device by date of form creation, by alphabetical order of the form title or by a priority assigned for the forms. However, users will fill out information only on select forms that are relevant to their task at any given time. This makes selecting the right forms very difficult and time consuming.

SUMMARY OF THE INVENTION

The disclosure overcomes the deficiencies of the prior art with a system and method for creating a manifest that groups forms according to tasks. In one embodiment, the system includes a manifest application. The manifest application is configured to determine tasks and a first order of the tasks, to determine forms associated with the tasks and a second order of the forms corresponding to the tasks, to generate user interface elements that link to the forms corresponding to the tasks, to generate a manifest grouping the tasks in the first order and the forms in the second order, the manifest including the user interface elements and to provide the manifest for display on a portable computing device.

Other aspects include corresponding methods, systems, apparatuses, and computer program products for these and other innovative aspects.

The manifest organizes the workflow for form processing to create a more efficient system that ensures that tasks and forms are completed. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
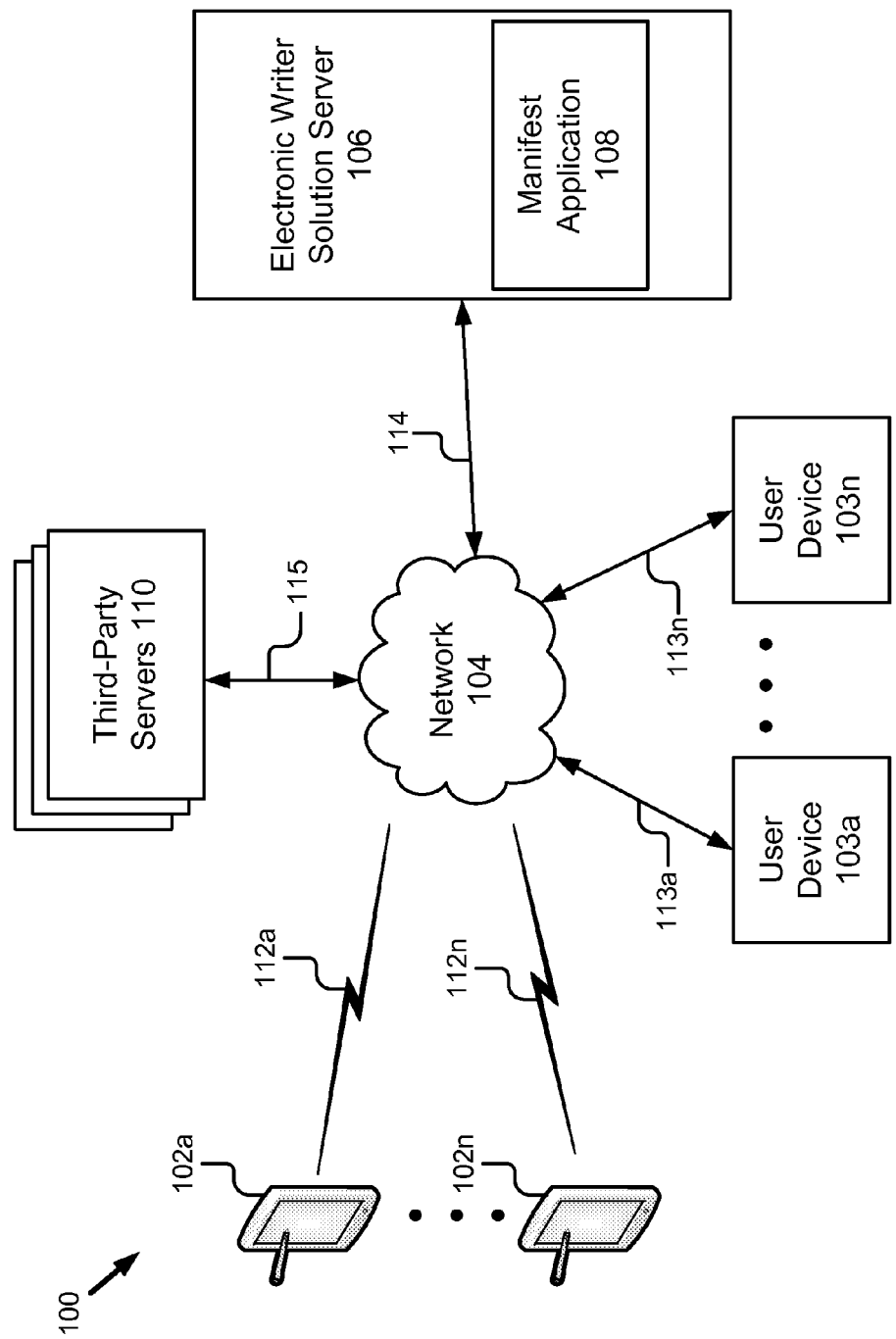
FIG. 1 is a high-level block diagram illustrating one embodiment of a system for grouping forms by one or more tasks in one or more manifests.

A description of a system and method for creating a manifest that groups forms according to tasks follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a high-level block diagram of a system 100 for creating a manifest that groups forms according to tasks. The illustrated embodiment of the system 100 comprises: portable computing devices 102a-102n, user devices 103a-103n, an electronic writer solution server 106 and third-party servers 110 that are each communicatively coupled to the network 104. In FIG. 1 and the remaining figures, a letter after a reference number, for example, "103a" is a reference to the element having that particular reference number. A reference number in the text without a following letter, for example "103," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of portable computing devices 102a-102n, the plurality of user devices 103a-103n, the electronic writer solution server 106 and the plurality of third-party servers 110, in practice any number of networks 104 can be connected to the entities.

The third-party servers 110 are each coupled to the network 104 via signal line 115. The third-party server 110 is any computing device including a memory and a processor that manages a set of resources representing a meaningful entity for a business enterprise. The third-party server 110 includes a domain specific application (not shown) that is particular to the business workflow associated with the third-party server 110. For example, a third-party server 110 includes a content management system (e.g., Microsoft™ SharePoint), an online collaboration system (e.g., Google™ Drive, Soonr™), an email server (e.g., Microsoft™ Outlook), a calendar server (e.g., Google™ Calendar), a healthcare management system (e.g., Epic EMR), a document management server (e.g., Objectif Lune™), etc. In one embodiment, the third-party server 110 is adapted to send and receive data from the electronic writer solution server 106. In one embodiment, the third-party server 110 sends form data (related to the business workflow) to the electronic writer solution server 106 for including in the manifest sent to the portable computing device 102. The third-party server 110 sends information (e.g., images, text, scalable vector graphics, drawing primitives, line and fill color, etc.) to the electronic writer solution server 106 relating to user interface elements (e.g., checkboxes, radio buttons, text entry boxes, media containers, etc.) to include in the manifest. Optionally, the third-party server 110 sends information relating to the business workflow (e.g., form title, company name, worker name, delivery date, order date, tracking number, account number, etc.) to include in the manifest.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive a manifest that includes forms, add stroke annotations to the forms and send the annotated forms to the electronic writer solution server 106. A form is any document that includes fields (i.e., blank spaces) for insertion of requested information. The form when filled out with the requested information may be a statement, an order, a request, etc. For example, a form can be a tax form, an insurance form, a medical record form, an inspection form, a proof of delivery form, a charitable use form, an electronic check, a job application, a survey, a receipt, etc.

In one embodiment, the portable computing device 102 is a tablet computer including a computing pad and a stylus. The computing pad is adapted to display form data and capture any strokes written on the form using the stylus or the user's fingertip. The strokes are typically displayed on top of the form, just as if written by pen on paper. The computing pad usually captures the strokes as a sequence of points or segments along with location, timing and pressure information. The computing pad sends the form data to the electronic writer solution server 106 including the captured strokes in any image format known to persons of ordinary skill in the art, for example, scalable vector graphics (SVG) file format, which can contain both strokes and images. In one embodiment, the computing pad attaches the information associated with the strokes, for example, the location, the pressure profiles and timing information with the form images as metadata. The portable computing device 102 determines location information by using global positioning system (GPS) circuitry included within the device itself to determine its location. In one embodiment, the portable computing device 102 accesses a database including pairs of media access control (MAC) addresses of local wireless points. To determine a location, the portable computing device 102 only retrieves the location corresponding to the access point MAC address from the database. For determining the portable computing device's 102 location indoors, the portable computing device 102 employs radio frequency, ultra-sound signal or invisible light communication. For example, the portable computing device 102 determines its location through wireless access points based on measuring the intensity of received signals.

The user devices 103a-103n are each coupled to the network 104 via the signal lines 113a-113n respectively. The user device 103 is any computing device that includes a memory and a processor, for example, a desktop computer, a laptop computer, etc. The user device 103 is accessed by users that have permission to access information from the electronic writer solution server 106, such as a creator of the form sent to portable computing devices 102 or an administrator of the electronic writer solution server 106. The user device 103 is adapted to send and receive data to and from the electronic writer solution server 106. For example, the user device 103 sends a request to the electronic writer solution server 106 to add one or more forms to a specific task in a manifest. The user device 103 includes a display for viewing the manifest provided by the electronic writer solution server 106.

The electronic writer solution server 106 is any computing device including a memory and a processor that is coupled to the network 104 via signal line 114. In one embodiment, the electronic writer solution server 106 processes completed forms in the manifest that are submitted from the manifest application 108. In one embodiment, the electronic writer solution server 106 delivers the completed forms in the one or more manifests to corresponding business workflows in the third-party servers 110. In one embodiment, the manifest application 108 is operable on the electronic writer solution server 106.

The manifest application 108 is described in further detail below with reference to FIG. 2. In one embodiment, the manifest application 108 determines tasks and a first order for the tasks, determines forms associated with each tasks and a second order for the forms within each task, generates user interface elements linking to the forms within each task, generates a manifest grouping the tasks in the first order and the forms in the second order, the manifest including the user interface elements and provides the manifest for display on a portable computing device 102.

Manifest Application 108

Figure 2:
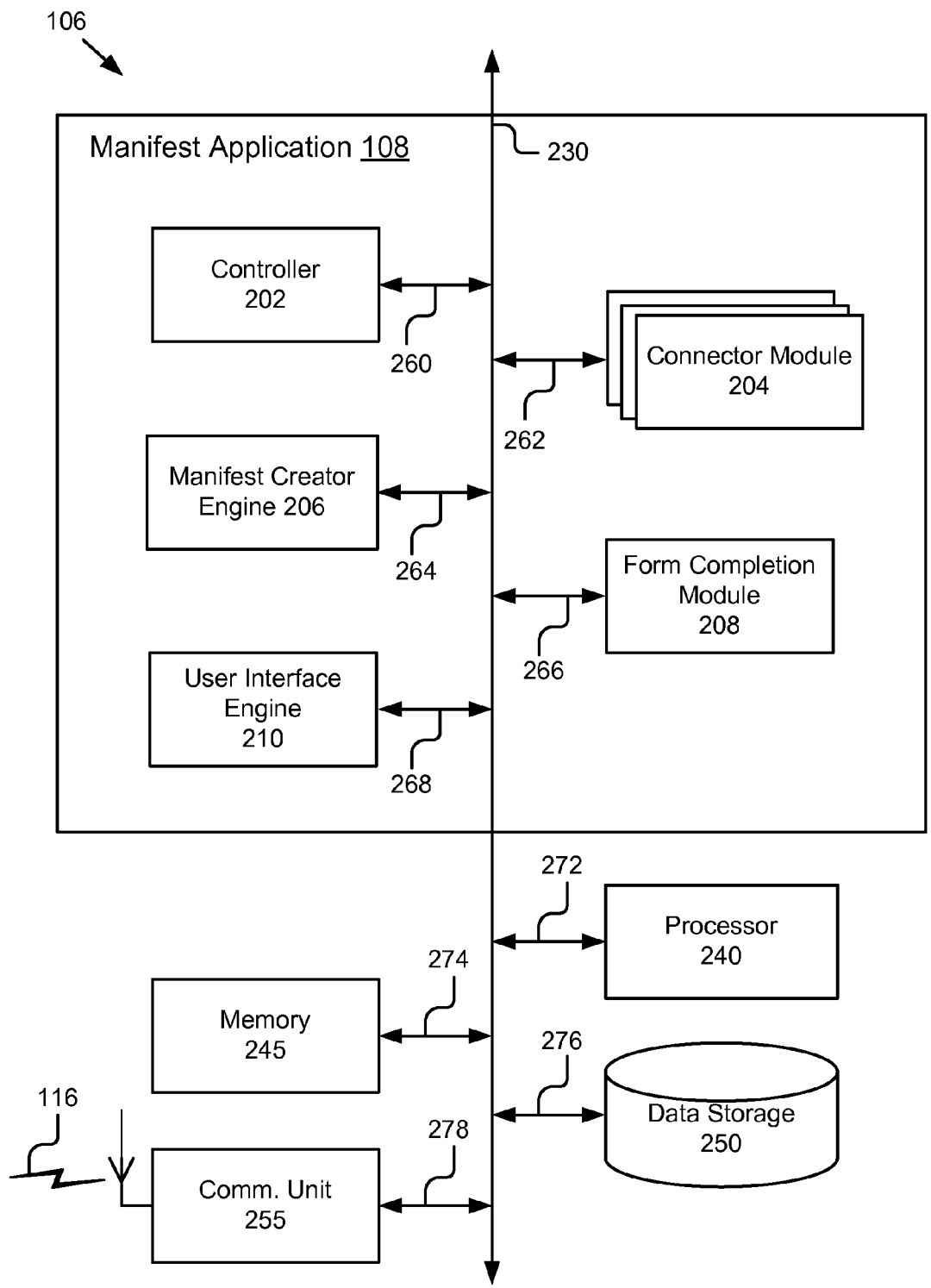
FIG. 2 is a block diagram illustrating one embodiment of a manifest application in more detail.

Referring now to FIG. 2, the manifest application 108 is shown in more detail. FIG. 2 is a block diagram of the electronic writer solution server 106 that includes a processor 240, a memory 245, a communication unit 255, data storage 250 and the manifest application 108.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components of the electronic writer solution server 106 via signal line 272. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components of the electronic writer solution server 106 via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the portable computing device 102 and transmits the requests to the manifest creator engine 206, for example a request to view a manifest. The communication unit 255 also receives information, such as completed form data, from the electronic writer solution server 106. The communication unit 255 transmits information including the manifest to the portable computing device 102 for display, for example, in response to a request. The communication unit 255 is coupled to the bus 230 via signal line 278. In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of forms received by the electronic writer solution server 106. The data storage 250 is coupled to the bus 230 for communication with the other components via signal line 276. In one embodiment, the data storage 250 receives information from the third-party servers 110 to store blank forms, as well as metadata describing the identity and the location of fields, labels, images and/or symbolic text for labels on the blank forms that correspond to the completed form data. In one embodiment, the data storage 250 receives information from the third-party servers 110 that include information (e.g., drawing primitives, transforms, line and fill color) associated with user interface elements for including in the manifests created by the manifest creator engine 206. In one embodiment, the data storage 250 stores the handwriting stroke data in a format, such as, InkML, SVG, etc. The stroke metadata also includes stroke information including a date and time that each stroke was input and the pressure information and the location information of each stroke.

In one embodiment, the manifest application 108 comprises a controller 202, a connector module 204, a manifest creator engine 206, a form completion module 208 and a user interface engine 210.

The controller 202 is software and routines for receiving data via the communication unit 255, routing the data to the appropriate engine or module and transmitting responses from modules or engines to the communication unit 255 for transmitting to the portable computing device 102 and other components of the system 100. In one embodiment, the controller 202 is a set of instructions executable by the processor 240 to provide the functionality described below for managing data transfer between the components of the electronic writer solution server 106 and other components of the system 100. In another embodiment, the controller 202 is stored in the memory 245 and is accessible and executable by the processor 240. In either embodiment, the controller 202 is adapted for cooperation and communication with the processor 240, the connector module 204, the manifest creator engine 206, the form completion module 208 and the user interface engine 210 and other components of the electronic writer solution server 106 via signal line 260.

The connector module 204 is software and routines for interfacing with the third-party servers 110, determining a first order for tasks and determining a second order for forms associated with the tasks. In one embodiment, the connector module 204 is a set of instructions executable by the processor 240 to provide the functionality described below for interfacing and integrating with the third-party servers 110 and business workflows associated with the third-party servers 110. In another embodiment, the connector module 204 is stored in the memory 245 and is accessible and executable by the processor 240. In either embodiment, the connector module 204 is adapted for cooperation and communication with the controller 202, the data storage 250 and other components of the electronic writer solution server 106 via signal line 262.

Determining a First Order for Tasks

The connector module 204 orders the tasks associated with one or more business workflows in the third-party servers 110 for display in the manifest. For example, the business workflow includes package delivery, online retail, customer issue tracking, healthcare management, etc.

In one embodiment, the connector module 204 orders the tasks based on calendar information associated with the business workflow. For example, the connector module 204 orders delivery packages according to their due date. For example, delivery packages that were ordered with one-day delivery have a higher order than delivery packages that were ordered with delivery guaranteed within 5-10 days. In another example, the connector module 204 orders a number of package delivery requests (i.e. tasks) for a delivery worker by order submission times when one or more customers placed orders with one or more online retailers, such as eBay®, Amazon®, etc. In yet another example, the connector module 204 orders out-patient appointments (i.e. tasks) for a healthcare worker based on the appointment time that each out-patient requested for consultation with the healthcare worker.

In another embodiment, the connector module 204 orders the tasks based on a priority (e.g., urgent, normal, low) associated with the tasks in a business workflow. For example, the connector module 204 orders the software issues (i.e. tasks) reported by customers through an issue tracking system (third-party server 110) for a maintenance professional based on a level of severity of the issues. The software issues, such as, network outage (urgent priority) are placed first in a list of tasks for the maintenance professional to diagnose and other secondary software issues, such as a faulty printer (low priority) are organized lower in the list.

In yet another embodiment, the connector module 204 orders the tasks associated with one or more business workflows based on a geographical location of the portable computing device 102. For example, the connector module 204 orders the delivery packages (i.e. tasks) in the manifest for a truck driver on a delivery route by ordering a delivery package for Amazon® first and a delivery package for eBay® second in the list of tasks because the first package is 0.5 miles away from the portable computing device's 102 location and the second package is 1.0 miles away from the portable computing device's 102 location.

In another embodiment, the connector module 204 orders the tasks according to a combination of calendar information, priority and geographic information. For example, the connector module 204 groups all delivery packages with a one-day delivery guarantee and within that group, the delivery packages are ordered according to the geographic location of the delivery worker's route. In another example, a patient is visiting a hospital to see (1) a general practitioner for an annual physical; (2) an ophthalmologist for an eye problem; and (3) a cardiologist for a heart problem. In addition, the general practitioner wants the patient to visit the lab for a blood draw and there is enough time for the patient to visit the lab between either the first and second appointment or the second and third appointment. The connector module 204 organizes the tasks according to the patient's appointment times and the location of the lab, which is located between the offices of the doctors for the second and third appointments. As a result, the connector module 204 organizes the tasks as: (1) visit the general practitioner for an annual physical; (2) visit the ophthalmologist for an eye problem; (3) go to the lab for blood work; and (4) visit the cardiologist for a heart problem.

Determining a Second Order for the Forms

The connector module 204 receives form data for the tasks associated with the business workflows from the third-party servers 110 or from the user device 103. For example, a package delivery business transmits to the connector module 204 a proof of delivery form, an inspection form, a cash on delivery form, etc. associated with delivering a package. In another example, a medical records system transmits to the connector module 204 a patient admission form, a patient agreement/contract form, a patient medication form, a medical assessment form, etc. associated with caring for a patient. In yet another example, a user device 103 submits an estate tax form 706, a gift tax form 709, a foreign earned income tax form 2555, etc. to the connector module 204 for a user filing taxes.

In one embodiment, the connector module 204 preserves the order of the forms as received from the third-party servers 110. In one embodiment, the connector module 204 orders the forms in a domain specific manner that is related to the business workflow. For example, for a user's tax portfolio, the connector module 204 includes the tax form 1040 first in a list and then adds other forms, such as, tax form 1098, tax form 1099, foreign earned income tax form 2555, etc. to the list following the tax form 1040. In another example, for a package delivery, the connector module 204 includes the proof of delivery form first and then adds other forms, such as, an inspection form, a cash on delivery form, a charitable use form, etc. following the proof of delivery form.

In another embodiment, the connector module 204 orders the forms associated with a business workflow in an alphabetical order. For example, the connector module 204 orders the forms alphabetically according to the titles associated with patient admittance in a hospital in an order, such as, an admission form, a bed reservation form, a check request form, etc.

In yet another embodiment, the connector module 204 orders the forms based on analytics, such as how the users fill out the forms in practice. The connector module 204 sends the first order of tasks and the second order of forms within each task to the manifest creator engine 206. The manifest creator engine 206 creates a manifest with the tasks in the first order and the forms for each task in the second order for presentation on the portable computing device 102. Once the users complete the manifest, the portable computing device 102 transmits the completed form to the form completion module 208, which extracts metadata including timing information. The form completion module 208 transmits the metadata to the connector module 204, which analyzes the metadata and determines a new order for the forms based on the analytics.

In one embodiment, the connector module 204 analyzes the submission time associated with the forms in the manifests to determine the order in which the forms were filled out by users. In another embodiment, the connector module 204 analyzes user annotations on the manifests, such as a time associated with checked checkmark boxes, selected radio buttons, handwriting strokes, etc. The connector module 204 identifies a trend in the annotated manifests and determines an efficient re-ordering of the forms in each of the tasks included in the manifests. For example, the connector module 204 starts out with a random order where a proof of delivery is the first form, a cash on delivery form is the second form and an inspection form is the last form for first 100 package deliveries and instructs the manifest creator engine 206 to create manifests in that random order. The connector module 204 identifies that the users receiving the delivery packages fill out the cash on delivery form first and the proof of delivery form second on most of the package deliveries. The connector module 204 determines a re-ordering for the next set of package deliveries where the cash on delivery form is the first form, the proof of delivery is the second form and the inspection form is the last form. In some embodiments, the connector module 204 uses a threshold percentage for the trend before changing the order of the forms. For example, the connector module 204 changes the order of a form once 80% of the users adhere to a different order.

In one embodiment, the connector module 204 comprises multiple connector modules 204 that each interface with and receive data from a different third-party server 110. In some examples, the data from the different third-party server 110 are stored separately as partitioned data for creating manifests. In another embodiment, the data is received by the same connector module 204. In one embodiment, the connector module 204 processes the data and transmits the processed data to the manifest creator engine 206. In another embodiment, the connector module 204 stores the received data in the data storage 250.

The manifest creator engine 206 is software and routines for creating one or more manifests. In one embodiment, the manifest creator engine 206 is a set of instructions executable by the processor 240 to provide the functionality described below for creating the one or more manifests. In another embodiment, the manifest creator engine 206 is stored in the memory 245 and is accessible and executable by the processor 240. In either embodiment, the manifest creator engine 206 is adapted for cooperation and communication with the controller 202, the connector module 204, the data storage 250 and other components of the electronic writer solution server 106 via signal line 264.

In one embodiment, the manifest creator engine 206 receives the first order of tasks and the second order of forms within each task from the connector module 204. The manifest creator engine 206 generates a manifest with the tasks listed in the first order and forms within each task organized in the second order where each task has a different order of forms. For example, the manifest creator engine 206 receives a first task for delivering a package from Amazon® and a second task for delivering a package from eBay®. Each task has ordered forms (e.g., proof of delivery, cash on delivery, etc.). The manifest creator engine 206 creates a delivery manifest for a delivery worker to deliver the two packages.

In another embodiment, the manifest creator engine 206 receives information relating to the business workflows from the third-party servers 110 that delegate tasks to include in the manifest. For example, for the package delivery business workflows, the manifest creator engine 206 receives form title, company name, truck driver name, delivery date, order date, tracking number, account number, etc. for including at the start of the manifest or at the end of the manifest. In one embodiment, the manifest creator engine 206 receives information (e.g., images, text, scalable vector graphics, drawing primitives, line and fill color, etc.) associated with instantiating user interface elements (e.g., checkboxes, radio buttons, text entry boxes, image containers, etc.) associated with one or more tasks in the manifests from the third-party servers 110. For example, for the package delivery business workflows, the manifest creator engine 206 instantiates checkboxes, text entry boxes, etc. for the truck driver to report exceptions (e.g., package damaged, recipient not available, etc.) occurring during a package delivery on the manifest.

In one embodiment, the manifest creator engine 206 creates a manifest including all the forms related to the tasks in the business workflow and instructs the user interface engine 210 to generate graphical data for displaying the manifest, which is then sent to the portable computing device 102. For example, for a package delivery business workflow, the manifest creator engine 206 groups the forms by each delivery destination (i.e. tasks) into the manifest associated with a delivery route for the day. The user interface engine 210 sends the manifest to the delivery worker's portable computing device 102 via the communication unit 255. The manifest includes a first task for delivering a first delivery package and a second task for delivering a second delivery package. The first task includes a proof of delivery form, an inspection form and an insurance release form for the first delivery destination on the delivery route. The second task includes a cash on delivery form, a proof of delivery form and a next delivery scheduling form for the second delivery destination on the delivery route. The ordering of each delivery destination (i.e. tasks) in the manifest is based on the geographical location of the portable computing device 102 and the ordering matches the delivery route taken by the truck driver or the delivery worker.

In another embodiment, the manifest creator engine 206 creates a manifest including all forms for a single task in the business workflow and sends the manifest to the portable computing device 102. For example, for healthcare management business workflow, the manifest creator engine 206 groups all the forms for a first patient into a first manifest, groups all the forms for a second patient into a second manifest and so on. The manifest creator engine 206 sends the manifest associated with only one patient to the portable computing device 102 of the healthcare worker at any given time.

In yet another embodiment, the manifest creator engine 206 creates a first manifest that lists summary information for available tasks and sends the manifest (but not the individual forms) to a first user's portable computing device 102*a*. Optionally, manifest creator engine 206 sends the same manifest to a second user's portable computing device 102*b*. The first user selects one of the tasks. For example, for a building maintenance workflow, the worker might select the task closest to the worker's current location that the worker is qualified to perform. The selection is sent to the manifest creator engine 206. The manifest creator engine 206 creates a second manifest with the summary information for the selected task and sends the manifest and all forms to the workers portable computing device 102. Next, the manifest creator engine 206 creates a third manifest that lists summary information for available tasks (that now does not include the task selected by the first worker) to the second user's portable computing device 102*b*. The manifest creator engine 206 enables two or more users to choose tasks and assures that more than one user cannot choose a particular task.

In one embodiment, the manifest creator engine 206 receives a request from a portable computing device 102 to add an additional form to at least one task in a manifest open on the portable computing device 102. For example, in the package delivery business workflow, the recipient receiving the package from the delivery worker may wish to exchange the product in the package. The delivery worker requests to add a product exchange form to the current package delivery task and receive the recipient's signature authorizing the product exchange. The manifest including the additional form is received by the manifest creator engine 206 for tracking and/or processing.

In one embodiment, the manifest creator engine 206 creates a manifest including a user interface element (e.g., hyperlink) for opening a form in the manifest on a portable computing device 102. In one embodiment, the user interface element includes the title of the form (e.g., hypertext) for identifying and for opening the form on the display of a portable computing device 102. In one embodiment, the user interface element uses a form identifier as a destination anchor to reference the form in the data storage 250. The form pointed to by the user interface element is opened on the portable computing device 102 responsive to the user clicking on the user interface element.

In one embodiment, the manifest creator engine 206 creates a global document for one or more business workflows that includes the manifest and the forms associated with the manifest. The manifest creator engine 206 associates the forms with the tasks in the manifest according to page numbers in the global document. For example, the manifest creator engine 206 associates a package delivery destination (i.e. a task) with a cash on delivery form on page 10, a proof of delivery form on page 17 and a next delivery scheduling form on page 25 in the global document. The manifest creator engine 206 stores the association by page number as metadata for the tasks in the manifest in the global document. The metadata is used to keep track of manifests and their associated forms for different business workflows.

The manifest creator engine 206 transmits the global document to the portable computing device 102. For example, a global document for a delivery business workflow is sent to a delivery worker's portable computing device 102. The delivery worker clicks on the first delivery package destination in the global document on the portable computing device 102. The delivery worker is directed to fill out the cash on delivery form on page 10, then the proof of delivery form on page 17 and finally the next delivery scheduling form on page 25 in the global document to complete the delivery to the first delivery package destination.

In one embodiment, the manifest creator engine 206 receives the global document filled out by the user of the portable computing device 102. The portable computing device 102 submits the global document as a whole to the manifest creator engine 206. For example, a global document for package deliveries is submitted as a whole when the delivery worker completes the delivery route for the day.

The manifest creator engine 206 splits the global document into individual manifests including completed forms. In one embodiment, the manifest creator engine 206 sends the individual manifests including the completed forms split from the global document to the connector module 204. In another embodiment, the manifest creator engine 206 sends the completed forms to the corresponding business workflows in the third-party servers 110.

For example, a global document for package deliveries includes the filled out forms associated with a first set of delivery destinations (i.e. tasks) for the Amazon® online retailer, the filled out forms associated with a second set of delivery destinations for the eBay® online retailer and the filled out forms associated with a third set of delivery destinations for the Newegg.com® online retailer. The manifest creator engine 206 splits the global document into individual manifests including the completed forms associated with each online retailer's set of delivery destinations. The manifest creator engine 206 transmits the individual manifests via the communication unit 255 to each online retailer's server 110.

The form completion module 208 is software and routines for receiving form data from a user, identifying the form completion data in the manifest and the forms associated with the manifest and tracking the status of the forms. In one embodiment, the form completion module 208 is a set of instructions executable by the processor 240 to provide the functionality described below for receiving and identifying the form completion data. In another embodiment, the form completion module 208 is stored in the memory 245 and is accessible and executable by the processor 240. In either embodiment, the form completion module 208 is adapted for cooperation and communication with the processor 240, the connector module 204, the manifest creator engine 206, the user interface engine 210, the data storage 250 and other components of the electronic writer solution server 106 via signal line 266.

In one embodiment, the form completion module 208 receives the manifest and the forms from the portable computing device 102. The form completion module 208 receives user annotations on the forms and the manifest. For example, a healthcare worker annotates a health checkup form to include the follow up tests carried out on a patient, such as a blood pressure test, a pupil dilation test, etc. In another example, a delivery worker annotates an inspection form with information about the damage on the delivery package during transportation and adds his signature to confirm that he inspected the delivery package.

User annotations can take the form of symbolic data and stroke data. Symbolic data includes symbolic representations input using a soft keyword or symbolic fields, such as checkmarks. The symbolic data includes a time and a location of inputting the data. In some embodiments, the symbolic data is associated with a field.

The stroke data includes handwriting data and comprises a list of x-y locations where the stylus, pen or other pointing device, like a finger, was sensed and the time of contact. In addition to the x-y locations, the form completion module 208 captures the time of each stroke or each point, the pressure of the stylus, which stylus was used or which end of a stylus was used. In some embodiments, the form completion module 208 converts the stroke data into a vector description ordered by the time of writing including color, width and pressure information. The form completion module 208 stores the vector description of the strokes in the data storage 250. In one embodiment, the form completion module 208 saves the captured strokes in a stroke format known to any person of ordinary skill in the art, including SVG or Ink Markup Language (InkML).

In one embodiment, the form completion module 208 identifies pixels in a form image that represent handwriting strokes based on, for example, the pixel intensities, the color of the pixels, etc. The stroke identification module 208 identifies the handwriting strokes for a field by a field identifier. In one embodiment, the form completion module 208 receives metadata along with the received form image that includes position information of the handwriting strokes in the form image. The form completion module 208 identifies the position of each stroke in the form image based on the metadata.

In one embodiment, the form completion module 208 receives the completed form data including handwriting strokes (e.g. in InkML or other vector format) from the controller 202. The received form data also includes an unmarked blank form image (i.e., an image of the form without any strokes) as metadata. In another embodiment, the form completion module 208 generates completed form data for each completed form from an input completed form image by, for example, subtracting the input completed form image with the unmarked blank form image. The form completion module 208 then identifies the position of each stroke within the completed form data and compares it to the known location of the fields in the form.

In one embodiment, the form completion module 208 tracks the status of the forms and identifies whether the forms are submitted, edited or left blank on the user interface element that is pointing to each form. For example, the hypertext pointing to a cash on delivery form appends "Submitted" or "Edited" at the end of the hypertext to indicate the status of the form. In one embodiment, the form completion module 208 removes the entry in the manifest for a task when all the forms associated with that task are submitted. For example, the form completion module 208 removes the entry for the first delivery destination in the delivery package manifest when the proof of delivery form, the inspection form and the insurance release form associated with the first delivery destination are filled and submitted from the portable computing device 102 of the delivery worker.

In one embodiment, the form completion module 208 tracks the status of forms based on user annotations made in the manifest on the portable computing device 102. In one embodiment, the annotations are in the form of handwriting strokes on the manifest. For example, a delivery worker is unable to deliver a package to a recipient as the recipient is not available to sign the proof of delivery. The delivery worker adds in handwriting on the manifest for that delivery destination that the recipient is "Unavailable". In another example, the delivery worker notices that the delivery package is damaged when delivering at the destination location listed on the delivery manifest. The delivery worker captures an image of the damaged delivery package, attaches the image to the manifest for that delivery destination and adds in handwriting that the delivery package is "Damaged" on top of the image. In another embodiment, the user annotations are symbolic representations entered by the user on the manifest using a soft keyboard or a physical keyboard on the portable computing device 102.

In one embodiment, the form completion module 208 receives user annotations in the user interface elements (e.g., checkboxes, radio buttons, text entry boxes, image containers, etc.) instantiated in the manifest for each of the tasks. For example, in the delivery business workflow, each delivery destination (i.e. task) in the delivery manifest includes a checkmark box next to a text phrase (e.g., Delivery completed, Exception occurred, etc.) that the delivery worker checks to update the status of delivery for that delivery destination. In another example, in the healthcare management workflow, each patient appointment task in the healthcare worker manifest includes a radio button next to a text phrase (e.g., Insured, Not insured) that the healthcare worker can select to indicate the health insurance particulars for that patient appointment task.

The user interface engine 210 is software including routines for generating graphical data for displaying a manifest and associated forms where handwriting strokes are added to fields in the forms. In one embodiment, the user interface engine 210 is a set of instructions executable by the processor 240 to generate the manifest. In another embodiment, the user interface engine 210 is stored in the memory 245 and is accessible and executable by the processor 240. In either embodiment, the user interface engine 210 is adapted for cooperation and communication with the processor 240 and other components of the computing device 200 via signal line 268.

In one embodiment, the user interface engine 210 generates graphical data for displaying a summary and forms into which stroke data from the user can be inserted. The summary comprises a list of tasks to be completed by the user and within each task there is a description of the relevant forms. In one embodiment, the graphical data could include JavaScript Object Notation (JSON) descriptions for the portable computing device 102 to render the manifest including the user interface elements pointing to the forms. In one embodiment, the user interface engine 210 receives instructions from the form completion module 208 to render strokes on the form based on the vector description.

Example User Interfaces

Figure 3:
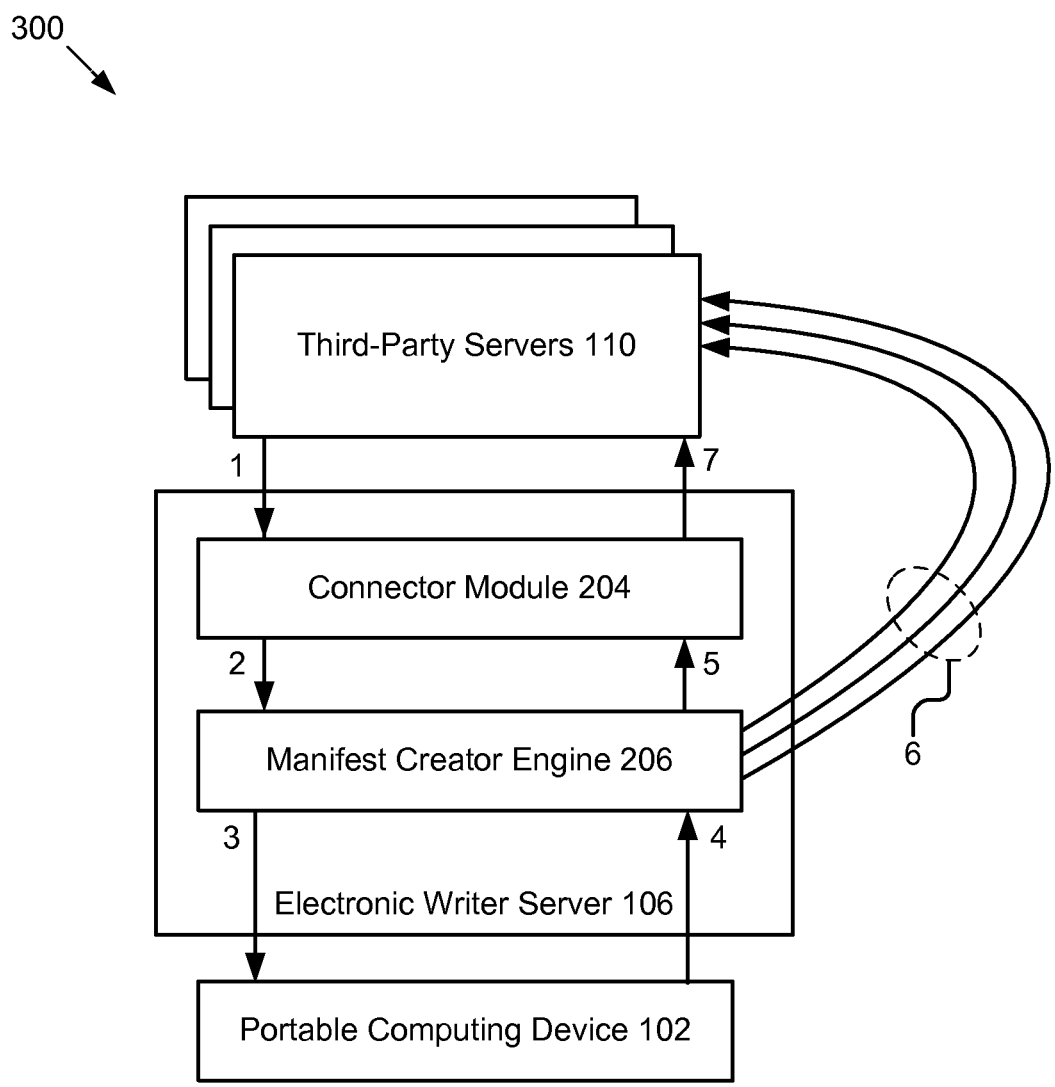
FIG. 3 is a graphic representation of the process for creating and routing a manifest.

Turning now to FIG. 3, a graphic representation 300 for creating a manifest and routing the manifest is illustrated. The graphic representation 300 illustrates seven steps for creating a manifest and routing the manifest. The graphic representation 300 comprises: third-party servers 110, the electronic writer solution server 106 and the portable computing device 102. The electronic writer solution server 106 includes the connector module 204 and the manifest creator engine 206. The third-party servers 110 send information relating to their respective business workflows to the connector module 204 in the electronic writer solution server 106 as indicated by number "1" in the graphic representation 300. The connector module 204 orders the tasks and orders the forms within each task in the business workflows.

The connector module 204 sends the ordered forms within each task to the manifest creator engine 206 as indicated by number "2" in the graphic representation 300. The manifest creator engine 206 creates a manifest that groups the ordered forms by the ordered tasks. The manifest includes user interface elements (e.g., hypertext) for pointing to each form.

The manifest creator engine 206 sends the manifest for presentation on the display of the portable computing device 102 as indicated by number "3" in the graphic representation 300. The portable computing device 102 receives user annotations (e.g., handwriting strokes, checked checkmark boxes, selected radio button, etc.) on the one or more forms grouped by tasks in the one or more manifests. In one embodiment, the portable computing device 102 receives user annotations on the summary section of the manifest. In another embodiment, the portable computing device 102 attaches an image to a form in the manifest.

The portable computing device 102 transmits the manifest including the user annotated forms back to the manifest creator engine 206 as indicated by number "4" in the graphic representation 300. In some embodiments (not illustrated), the portable computing device 102 transmits the manifest to the form completion module 208, which transmits the manifest and the extracted user annotations to the manifest creator engine 206. The manifest creator engine 206 receives the global document submitted as a whole by the portable computing device 102. In one embodiment, the manifest creator engine 206 splits the global document into individual manifests including all the completed forms.

The manifest creator engine 206 sends the individual manifests including all the completed forms back to the connector module 204 as indicated by number "5" in the graphic representation 300. The manifest creator engine 206 also sends the completed forms back to the corresponding business workflows in the third-party servers 110 as indicated by number "6" in the graphic representation 300. The connector module 204 receives the manifests including all the completed forms from the manifest creator engine 206. The connector module 204 sends the user annotations, images attached to the manifest and/or the one or more manifests back to the corresponding business workflows in the third-party servers 110 as indicated by number "7".

Figure 4:
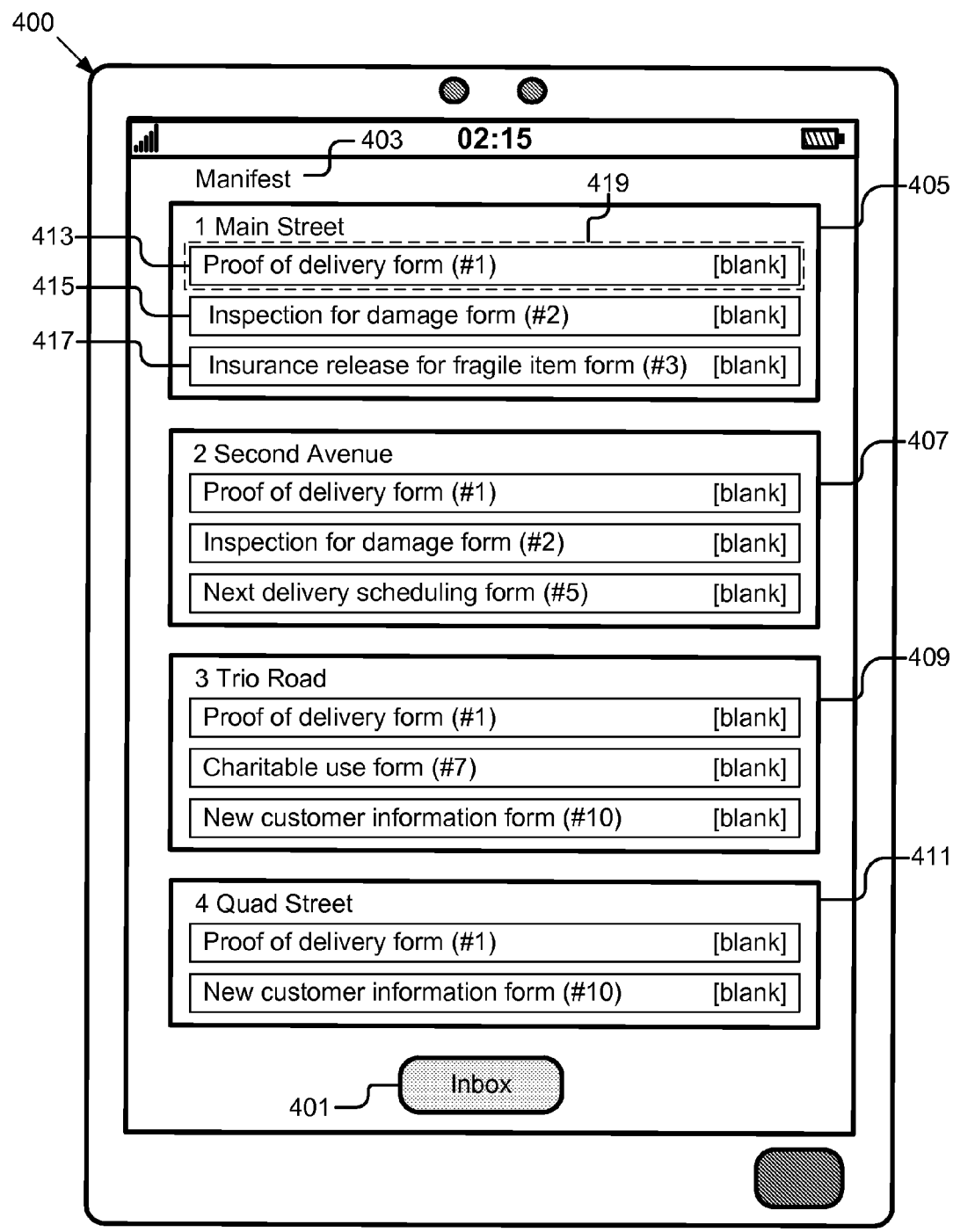
FIG. 4 is a graphic representation of an embodiment of a user interface that displays a manifest.

FIG. 4 is a graphic representation of an embodiment of a user interface 400 that displays a manifest that is generated responsive to the user clicking on the button "Inbox" 401. In this graphic representation, the user interface 400 includes a summary page of the manifest 403 that is filled out by a delivery worker on a delivery route. The "Delivery Manifest" 403 includes a list of ordered delivery destinations "Main Street" 405, "Second Avenue" 407, "Trio Road" 409 and "Quad Street" 411 that are tasks to be completed by the delivery worker. The delivery destination "Main Street" 405 includes an ordered list of forms "Proof of delivery form" 413, "Inspection for damage form" 415 and "Insurance release for fragile item form" 417 that the delivery worker has to fill out at delivery destination "Main Street" 405.

The forms each include a user interface element 419 that links to the corresponding form. When a user clicks on the user interface element, for example, the "Proof of delivery form" 413, the manifest opens the proof of delivery form. The user interface element 419 also includes a name for each form and a status (e.g., blank, submitted, edited, etc.) for each form.

Figure 5:
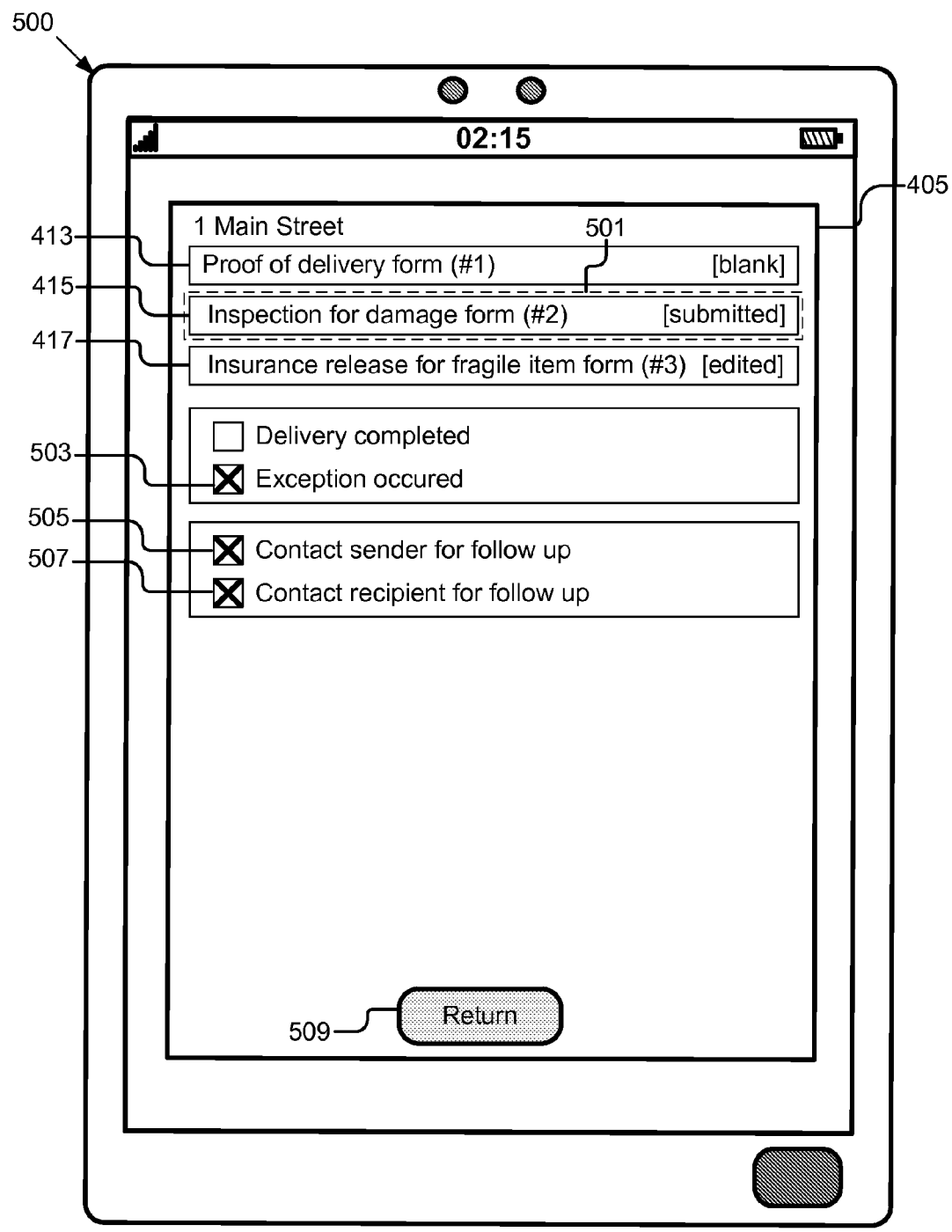
FIG. 5 is a graphic representation of an embodiment of a user interface that displays user annotations on the manifest.

FIG. 5 is a graphic representation 500 of an embodiment of a user interface 500 that displays user annotations on the manifest. In this graphic representation, the user interface 500 includes an expanded view of the task represented by delivery destination "Main Street" 405 in FIG. 4. In this graphic representation, the delivery worker notices that an exception has occurred and fills out the "Inspection for damage form" 415. The user interface element 501 that links to the "Inspection for damage form" 415 displays a status of "submitted" indicating that the delivery worker has completed the "Inspection for damage form" 415.

The delivery worker checks the checkbox 503 associated with "Exception occurred" to indicate that there was an exception with the delivery for "Main Street" 405. Additionally, the delivery worker checks the checkbox 505 associated with "Contact sender for follow up" and the checkbox 507 associated with "Contact recipient for follow up" to indicate that the sender and the recipient have to be notified. The task "Main Street" 405 includes a button "Return" 509 to return to the "Summary" page 403 illustrated in FIG. 4, which displays the next ordered list of delivery destinations.

Figure 6:
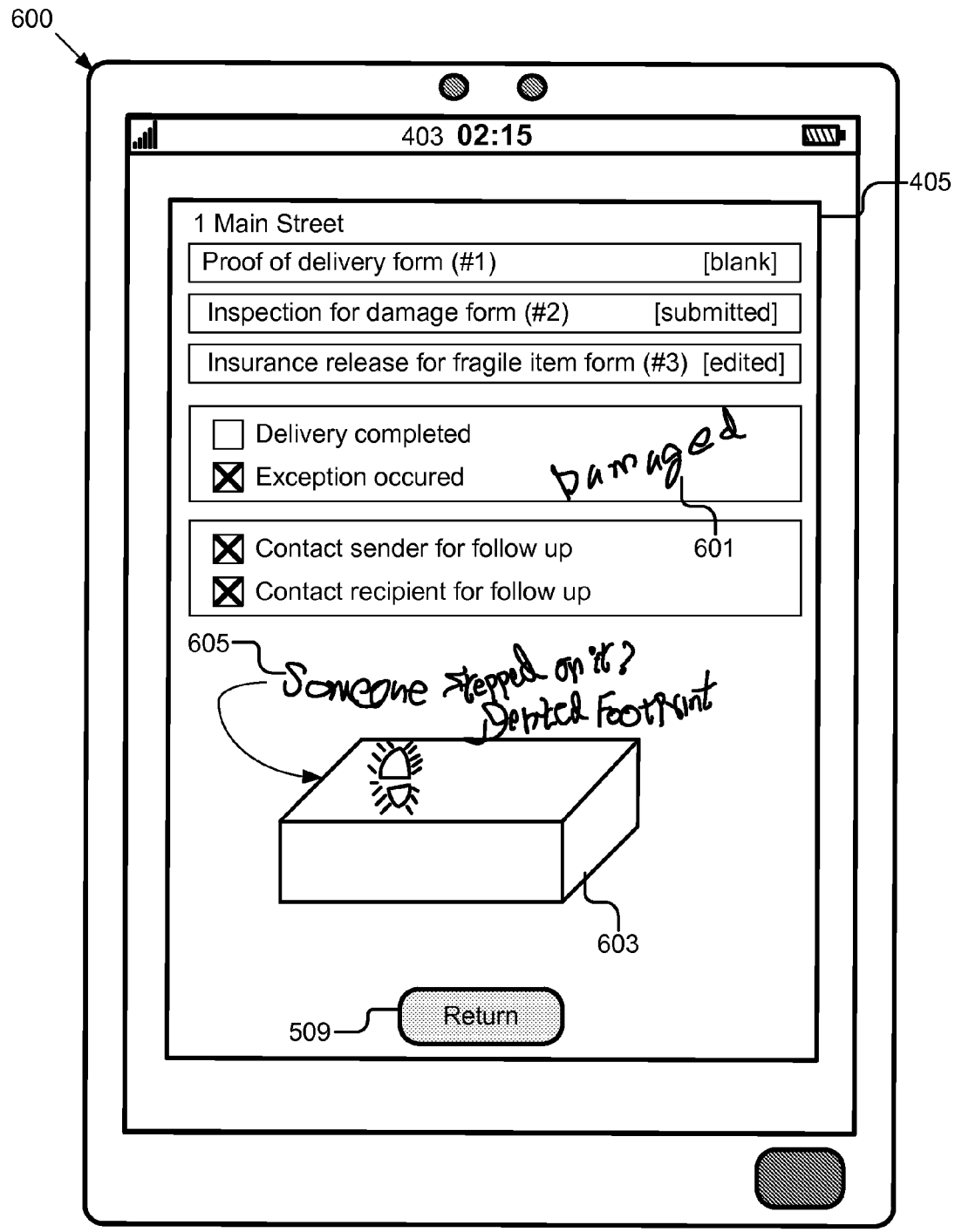
FIG. 6 is a graphic representation of another embodiment of the user interface that displays user annotations on the manifest.

FIG. 6 is a graphic representation of another embodiment of the user interface 600 that displays user annotations on the manifest. In this graphic representation, the user interface 600 includes an expanded view of the task represented by delivery destination "Main Street" 405. The user interface 600 includes a first handwritten annotation 601 of the delivery worker indicating a damaged package being the exception that occurred in the task represented by delivery destination "Main Street" 405. Additionally, the user interface 600 displays an image 603 of the damaged package attached by the delivery worker and a second handwritten annotation 605 describing the damage. The task "Main Street" 405 includes a button "Return" 509 to return to the "Summary" page 403 illustrated in FIG. 4, which displays the next ordered list of delivery destinations. In an alternative embodiment, user interface 500 includes a third hand drawn annotation 403 that is a sketch of the damaged package.

Methods

Figure 7:
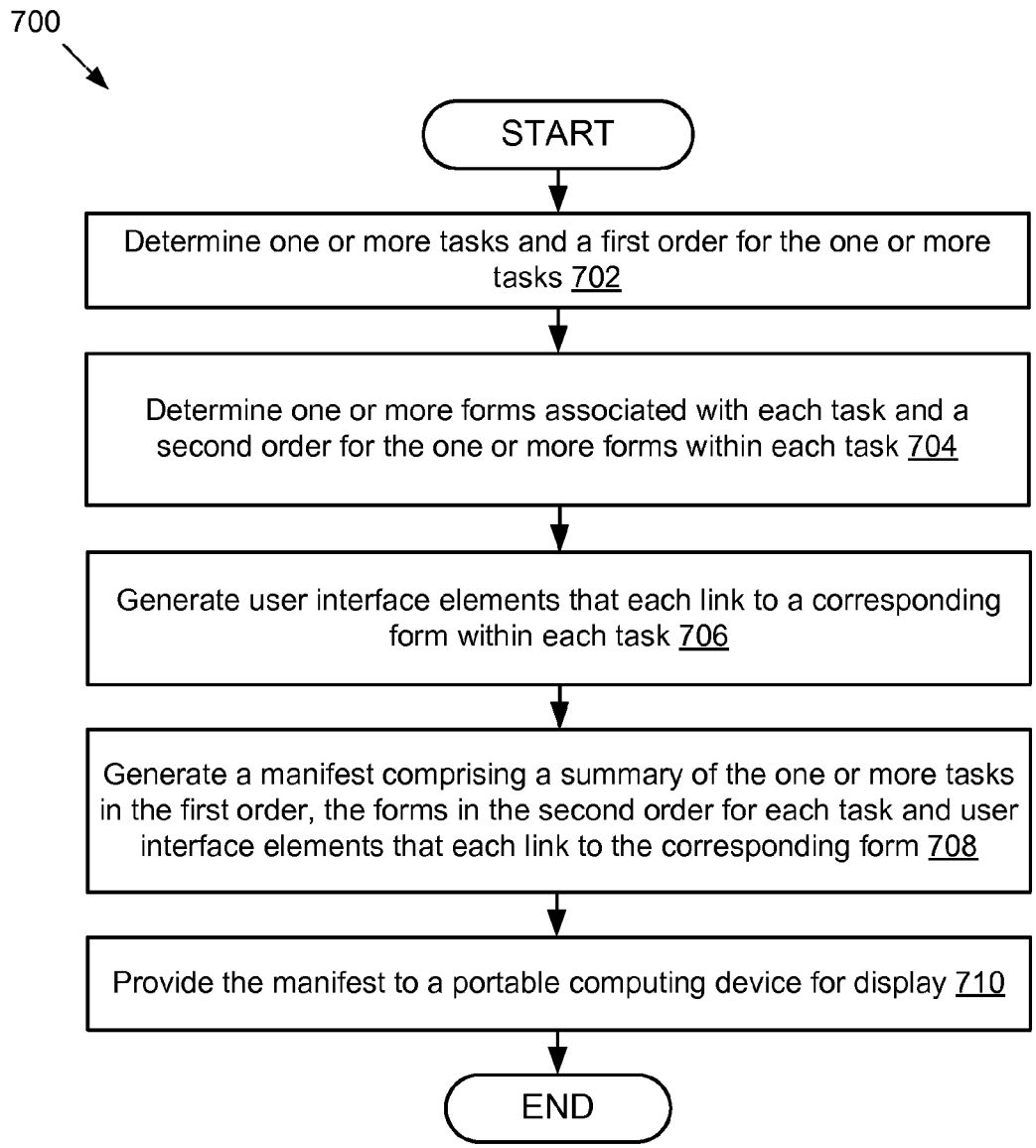
FIG. 7 is a flow diagram of one embodiment of a method for creating one or more manifests.
Figure 8:
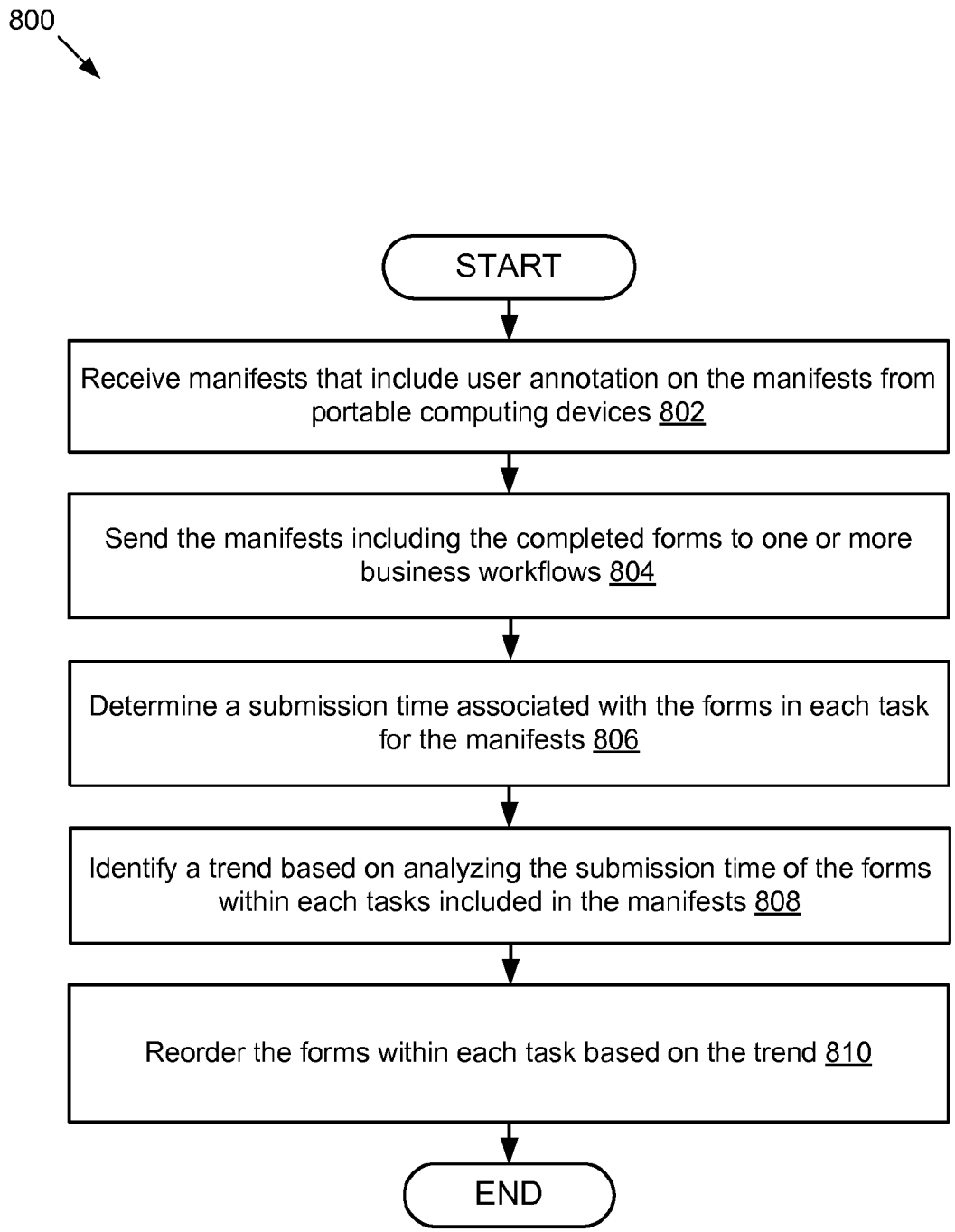
FIG. 8 is a flow diagram of one embodiment of a method for processing one or more manifests.

Referring now to FIGS. 7-8, various embodiments of the methods of the invention will be described. FIG. 7 is a flow diagram 700 of an embodiment of a method for creating one or more manifests. The manifest application 108 includes a connector module 204 and a manifest creator engine 206. In one embodiment, the connector module 204 determines 702 one or more tasks and a first order for the one or more tasks. For example, the connector module 204 orders a number of package delivery requests (i.e. tasks) for a delivery worker by order submission times when one or more customers placed orders with online retailers, such as eBay®, Amazon®, etc. The connector module 204 determines 704 one or more forms associated with each task and a second order for the one or more forms within each task. For example, the connector module 204 orders the forms associated with patient admittance in a hospital alphabetically in the following order: admission form, bed reservation form, check request form. In one embodiment, the manifest creator engine 206 generates 706 user interface elements that each link to a corresponding form within each task. The one or more user interface elements identify the name of the forms they are linking to and a status associated with the forms (for e.g., blank, submitted, edited, etc.).

The manifest creator engine 206 generates 708 a manifest comprising a summary of the one or more tasks in the first order, the forms in the second order within each task and user interface elements that each link to the corresponding form. For example, for a package delivery business workflow, the manifest creator engine 206 groups the forms by each delivery destination (i.e. tasks) into the manifest associated with a delivery route. The manifest creator engine 206 provides 710 the manifest to a portable computing device 102 for display. For example, the manifest creator engine 206 instructs the user interface engine 210 to generate graphical data for displaying the manifest that the user interface engine 210 sends via the communication unit 255 to the delivery worker's portable computing device 102.

FIG. 8 is a flow diagram 800 of an embodiment of a method for processing manifests. The manifest application 108 includes a connector module 204 and a manifest creator engine 206. In one embodiment, the manifest creator engine 206 receives 802 manifests that include user annotations on the manifests from portable computing devices 102. For example, a delivery worker unable to deliver a package to a recipient adds in handwriting on the manifest for that delivery destination that the recipient is "Unavailable". The manifest creator engine 206 sends 804 the manifests including completed forms to one or more business workflows. In one embodiment, the manifest creator engine 206 receives a global document the manifest and the completed forms filled out by the portable computing device 102. The manifest creator engine 206 splits the global document into individual manifests including completed forms. In an example for a global document of package deliveries, the global document includes the completed forms associated with a first set of delivery destinations (i.e. tasks) for Amazon® online retailer, the completed forms associated with a second set of delivery destinations for eBay® online retailer and the completed forms associated with a third set of delivery destinations for Newegg.com® online retailer. The manifest creator engine 206 splits the global document into individual manifests including the completed forms associated with each online retailer's set of delivery destinations. The manifest creator engine 206 routes the individual manifests to each online retailer's server 110 and respective package delivery business workflow.

The connector module 204 determines 806 a submission time associated with the forms in each task for the manifests. In one embodiment, the connector module 204 analyzes the stroke timestamps associated with the forms. The connector module 204 identifies 808 a trend based on analyzing the submission times of the one or more forms within each task included in the manifests. For example, in a package delivery business workflow, a proof of delivery is the first form, a cash on delivery form is the second form and an inspection form is the last form for most package deliveries. The connector module 204 identifies that the users receiving the delivery packages fill out the cash of delivery form first and the proof of delivery form second on most of package deliveries. The connector module 204 reorders 810 the one or more forms within each task based on the trend. For example, the connector module 204 determines a re-ordering for the next set of package deliveries where the cash on delivery form is the first form, the proof of delivery is the second form and the inspection form is the last form.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining one or more tasks and a first order for the one or more tasks;
   determining one or more forms associated with a task and a second order for the one or more forms within the task;
   generating one or more user interface elements that link to the one or more forms within the task and include an indication of a status of the one or more forms within the task;
   generating a manifest comprising a summary of the one or more tasks arranged in the first order, the one or more forms arranged in the second order within the task, and the one or more user interface elements that link to the one or more forms within the task and include an indication of a status of the one or more forms within the task;
   providing the manifest for display on a portable computing device;
   analyzing metadata including a submission time of the one or more forms within the task in the manifest, the one or more forms including user annotations being filled out on the portable computing device;
   identifying a third order for arranging the one or more forms within the task in the manifest based on analyzing the metadata including the submission time of the one or more forms within the task in the manifest; and
   reordering the one or more forms within the task in the manifest based on the third order.

2. The method of claim 1 wherein the first order for the one or more tasks is based on information including a due date associated with the one or more tasks in a calendar of one or more business workflows.

3. The method of claim 1 wherein the second order for the one or more forms within the task is based on an alphabetical order.

4. The method of claim 1 wherein
   the one or more user interface elements display a name associated with the one or more forms.

5. The method of claim 1 further comprising:
   receiving the manifest from the portable computing device;
   determining the user annotations including handwriting strokes on the one or more forms within the task in the manifest; and
   sending the manifest to one or more business workflows.

6. The method of claim 1 further comprising removing an entry in the manifest for the task when the one or more forms within the task are completed.

7. The method of claim 1 further comprising:
   generating a global document including a page for the manifest including the one or more tasks and a page for each of the one or more forms within the task, wherein the one or more forms are associated with the task on the page for the manifest by page numbers on the global document;
   providing the global document for display on the portable computing device;
   receiving the global document as a whole from the portable computing device, the global document including the user annotations on the page for the manifest including the one or more tasks and the page for each of the one or more forms within the task;
   splitting the global document into one or more individual manifests, each individual manifest including the one or more tasks and the one or more forms within the task; and
   sending the one or more individual manifests to one or more business workflows.

8. A system comprising:
   a processor;
   a connector module stored on a memory and executable by the processor, the connector module configured to determine one or more tasks and a first order for the one or more tasks and to determine one or more forms associated with a task and a second order for the one or more forms within the task;
   a manifest creator engine stored on the memory and executable by the processor, the manifest creator engine coupled to the connector module and configured to generate one or more user interface elements that link to the one or more forms within the task and include an indication of a status of the one or more forms within the task and to generate a manifest comprising a summary of the one or more tasks arranged in the first order, the one or more forms arranged in the second order within the task, and the one or more user interface elements that link to the one or more forms within the task and include an indication of a status of the one or more forms within the task;
   a communication unit stored on the memory and executable by the processor, the communication unit configured to provide the manifest to a portable computing device for display; and
   a form completion module stored on the memory and executable by the processor, the form completion module configured to analyze metadata including a submission time of the one or more forms within the task in the manifest, the one or more forms including user annotations being filled out on the portable computing device, to identify a third order for arranging the one or more forms within the task in the manifest based on analyzing the metadata including the submission time of the one or more forms within the task in the manifest, and to reorder the one or more forms within the task in the manifest based on the third order.

9. The system of claim 8 wherein the first order for the one or more tasks is based on information including a due date associated with the one or more tasks in a calendar of one or more business workflows.

10. The system of claim 8 wherein the second order for the one or more forms within the task is based on an alphabetical order.

11. The system of claim 8 wherein the one or more user interface elements display a name associated with the one or more forms.

12. The system of claim 8,
    wherein the manifest creator engine is configured to receive the manifest from the portable computing device and to determine the user annotations including handwriting strokes on the one or more forms within the task in the manifest; and
    wherein the connector module is configured to send the manifest to one or more business workflows.

13. The system of claim 8 wherein the manifest creator engine is configured to remove an entry in the manifest for the task when the one or more forms within the task are completed.

14. The system of claim 8, wherein the manifest creator engine is configured to generate a global document including a page for the manifest including the one or more tasks and a page for each of the one or more forms within the task, wherein the one or more forms are associated with the task on the page for the manifest by page numbers on the global document, to provide the global document for display on the portable computing device, to receive the global document as a whole from the portable computing device, the global document including the user annotations on the page for the manifest including the one or more tasks and the page for each of the one or more forms within the task, to split the global document into one or more individual manifests, each individual manifest including the one or more tasks and the one or more forms within the task and to send the one or more individual manifests to one or more business workflows.

15. A computer program product comprising a non-transitory computer useable medium including a computer readable program, wherein the computer readable program when executed on a computer causes the computer to:
   determine one or more tasks and a first order for the one or more tasks;
   determine one or more forms associated with a task and a second order for the one or more forms within the task;
   generate one or more user interface elements that link to the one or more forms within the task and include an indication of a status of the one or more forms within the task;
   generate a manifest comprising a summary of the one or more tasks arranged in the first order, the one or more forms arranged in the second order within the task, and the one or more user interface elements that link to the one or more forms within the task and include an indication of a status of the one or more forms within the task;
   provide the manifest to a portable computing device for display;
   analyze metadata including a submission time of the one or more forms within the task in the manifest, the one or more forms including user annotations being filled out on the portable computing device;
   identify a third order for arranging the one or more forms within the task in the manifest based on analyzing the metadata including the submission time of the one or more forms within the task in the manifest; and
   reorder the one or more forms within the task in the manifest based on the third order.

16. The computer program product of claim 15 wherein the first order for the one or more tasks is based on information including a due date associated with the one or more tasks in a calendar of one or more business workflows.

17. The computer program product of claim 15 wherein the second order for the one or more forms within the task is based on an alphabetical order.

18. The computer program product of claim 15 wherein the one or more user interface elements display a name associated with the one or more forms.

19. The computer program product of claim 15, wherein the computer readable program further causes the computer to:
   receive the manifest from the portable computing device;
   determine the user annotations including handwriting strokes on the one or more forms within the task in the manifest; and
   send the manifest to one or more business workflows.

20. The computer program product of claim 15, wherein the computer readable program further causes the computer to:
   remove an entry in the manifest for the task when the one or more forms within the task are completed.

* * * * *